(12) United States Patent
Batthish et al.

(10) Patent No.: US 7,984,387 B2
(45) Date of Patent: Jul. 19, 2011

(54) DYNAMIC UPDATE OF DATA ENTRY IN A USER INTERFACE

(75) Inventors: Violaine Batthish, Brampton (CA); John Frank Fellner, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2000 days.

(21) Appl. No.: 10/941,597

(22) Filed: Sep. 15, 2004

(65) Prior Publication Data

US 2006/0059429 A1    Mar. 16, 2006

(51) Int. Cl.
*G06F 3/048*    (2006.01)

(52) U.S. Cl. ........ 715/812; 715/224; 715/225; 715/274; 715/780; 715/783; 715/810; 715/813; 715/816; 715/830; 715/226; 715/823; 705/27

(58) Field of Classification Search ........... 715/274, 715/823, 780, 783, 810, 830, 812, 813, 816, 715/224, 225, 226; 705/27
See application file for complete search history.

(56) References Cited

U.S. PATENT DOCUMENTS

| | | | | |
|---|---|---|---|---|
| 5,396,417 A | * | 3/1995 | Burks et al. | 705/17 |
| 5,467,472 A | * | 11/1995 | Williams et al. | 1/1 |
| 5,598,519 A | * | 1/1997 | Narayanan | 715/219 |
| 5,621,875 A | * | 4/1997 | Mason et al. | 715/234 |
| 5,680,314 A | * | 10/1997 | Patterson et al. | 700/132 |
| 5,692,157 A | * | 11/1997 | Williams | 709/246 |
| 6,307,549 B1 | * | 10/2001 | King et al. | 715/810 |
| 6,920,143 B1 | * | 7/2005 | Ortiz et al. | 370/401 |
| 6,947,598 B2 | * | 9/2005 | Yogeshwar et al. | 382/232 |
| 7,523,144 B2 | * | 4/2009 | Chidiac et al. | 1/1 |
| 2004/0010446 A1 | * | 1/2004 | Vanska et al. | 705/14 |
| 2004/0153963 A1 | * | 8/2004 | Simpson et al. | 715/500.1 |
| 2005/0086297 A1 | * | 4/2005 | Hinks | 709/203 |
| 2005/0198352 A1 | * | 9/2005 | Fleck et al. | 709/232 |
| 2010/0095242 A1 | * | 4/2010 | Freeny, Jr. | 715/810 |
| 2010/0121876 A1 | * | 5/2010 | Simpson et al. | 707/769 |
| 2010/0257094 A1 | * | 10/2010 | Kumar et al. | 705/40 |

OTHER PUBLICATIONS

Bill Camarda, Using Microsoft Word 97, 1997, Que Corporation, Special Edition, p. 124.*
Microsoft Corporation, Microsoft Word 2000, 1999, Microsoft Corporation, Figure 2.*

* cited by examiner

*Primary Examiner* — Boris Pesin
*Assistant Examiner* — John Heffington
(74) *Attorney, Agent, or Firm* — Jeanine S. Ray-Yarletts

(57) ABSTRACT

A widget is incorporated into a user interface associated with a processing system to provide the user with a display of the entered data, together with any added text or other data modifications that result from application of a default format. The display thus enables the user to determine whether or not the default format can be used with the entered data, before the data is processed. The widget also provides a toggle capability, to allow the user to override the default behavior of the processing system and select a different valid format for use with the entered data, from a format priority list contained in the widget. The display and toggle capabilities cause the entered data to be processed by the system as intended by the user.

21 Claims, 2 Drawing Sheets

DYNAMIC UPDATE OF DATA ENTRY IN A USER INTERFACE

BACKGROUND OF THE INVENTION

1. Technical Field

The invention generally relates to a method for informing a user of the formatting that has been applied to specified data entered into a processing system. More particularly, the invention pertains to a method of the above type, wherein a widget is included in a user interface associated with the processing system to provide a display of the formatted data. Even more particularly, the invention pertains to a method of the above type wherein the widget enables a user to identify and select an alternative valid format, when available, for the specified data.

2. Description of Related Art

When data specified by a user is entered into a data processor or processing system, the system may need to format the data, such as by placing additional data elements proximate to it. Typically, this is done to enable the system to process the data, and generally requires the system to recognize certain characteristics or attributes of the entered data. The data is then formatted in accordance with the recognized characteristics. Thus, it will be readily apparent that significant problems can arise if the processing system makes an inaccurate assumption about the nature or characteristics of entered data.

As an example, the RPG (Report Program Generator) programming language has a wizard for use in generating source code such as Definition specifications. The wizard is adapted to receive data values that are constants, but may also receive data variables. In formatting data for the wizard, constants must be placed within, or wrapped in, quotation marks. Accordingly, if the RPG wizard determines that a data entry is a constant, a default format will be applied to the data entry, whereby the entry will be wrapped in quotation marks. On the other hand, variable data entries must not be wrapped in quotation marks. A different default format is therefore applied to detected variables, in order to achieve this result.

Unfortunately, certain comparatively common data values, entered into the RPG wizard as variables by a user, are frequently interpreted by the RPG wizard to be constants. When this occurs, an incorrect default format is applied to the data, causing the RPG system to process the data using the wrong logic. Moreover, at present a user may not initially realize that the entered data has been formatted incorrectly. As a result, the RPG wizard could generate over 100 lines of erroneous code or the like, before the user became aware of the problem in formatting.

A further example of incorrect data formatting is illustrated by the calendar function of Lotus Notes, Rev. 6. When creating a new calendar item, the user can specify the time for a meeting. If the user specifies only 3:00 for the start time, the time will be ambiguous, unless the processing system selects either 3:00 "a.m." or 3:00 "p.m." as a default. If "a.m." was selected automatically as a default, the time would still be inaccurately displayed, if "p.m." was intended. However, the user would not be informed of the error until a message was generated at the wrong time. Therefore, it would be advantageous to have an improved method, apparatus, and computer instructions for dynamically updating data entry in a user interface.

BRIEF SUMMARY OF THE INVENTION

Useful embodiment of the invention are directed to a method for operating a user interface to ensure that data entered into a processing system will be accurately interpreted by the processing system, and will be processed as intended by the user. The method includes the step of providing the user interface with a widget having a list of priority data formats, that are respectively developed within limits and rules of a parent class associated with the processing system. The method further comprises operating the widget to determine whether one or more of the formats is valid for the entered data, and then displaying the data using the format of first priority on the list, if at least one of the formats is valid for the data. If only one format is valid, the widget is either queried to indicate the value for the data using the first priority format, or else the data is modified. If more than one of the formats are valid, the data is displayed by the widget using any valid format selected by the user. After a valid format is finally selected, widget is queried to indicate the value for the data using the final selected format. If none of the formats on the list is valid for the data, the widget issues an error message, and the user is allowed to modify the data. Usefully, the widget has a toggle operable by the user to select any valid format. Preferably, the toggle comprises a button selectively displayed by the widget. Preferably also, the user is allowed to exit the user interface only after selecting a format that is valid for either the originally specified data, or for modified data. After exiting the user interface, the processing system generates a value for the data, using the selected, valid format.

BRIEF DESCRIPTION OF THE SEVERAL VIEWS OF THE DRAWINGS

The novel features believed characteristic of the invention are set forth in the appended claims. The invention itself, however, as well as a preferred mode of use and further objectives and advantages thereof, will best be understood by reference to the following detailed description of an illustrative embodiment when read in conjunction with the accompanying drawings, wherein:

DETAILED DESCRIPTION OF THE INVENTION

In the invention, a widget is incorporated into a user interface disposed to enter specified data into a processing system. The widget provides a user with visual indication of any modifications that are made to the entered data, as the result of a default format being applied to the data. For example, the widget displays any text added to the data by the default format, so that the user is made aware thereof. Moreover, the widget is provided with means for allowing a user to override the default behavior of a processing system, such as the RPG wizard or the like. In one embodiment, the widget provides the user with a button for use in toggling text added by the default format to be either on or off. Accordingly, the user may use the display and toggle capabilities to ensure that the entered data will be processed by the system as intended by the user.

Figure 1:
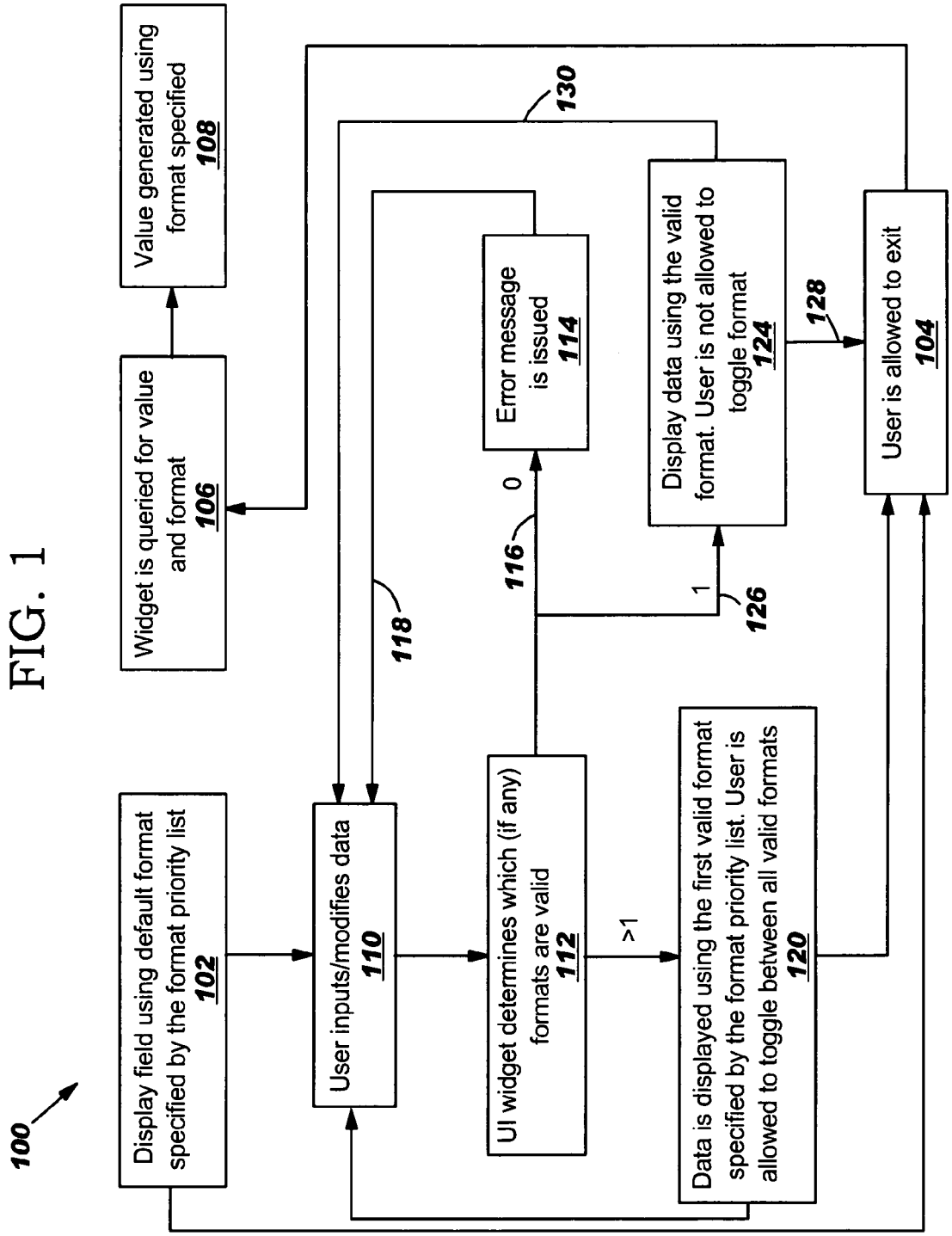
FIG. 1 is a flow chart illustrating an embodiment of the invention.

Referring to FIG. 1, flowchart 100 illustrates the operation of a user interface that can be dynamically updated by a user, in accordance with an embodiment of the invention. In the embodiment, a widget that includes a data format priority list is incorporated into the user interface. The format priority list is constructed from the validation codes for respective formats, and is in accordance with limits and rules of an associated parent class. The parent class is specified by a processing system disposed to receive input data from the user interface. The format priority list indicates each of the formats that will be valid for data of different types or categories, and further indicates the relative priorities of valid formats for a particular data type. In addition, the priority list is meant to indicate the format to select for the widget by default (this would be the first valid format in the priority list); the order in which the widget checks whether or not a format is valid; and which order the formats should be displayed/toggled through if more than one format is valid. When the user interface determines that entered data is of a particular type, the priority list is used to select a default valid format. If no data is entered, the first format in the list is selected as the default format.

A widget, as is known in the art and as generally used in connection with computers, is an element of a graphical user interface that displays information or provides a specific way for a user to interact with the operating system and/or application of a processing system.

Referring further to FIG. 1, there is shown a function block 102. Prior to data entry, the widget operates the user interface to display the data entry field using the default format specified by the format priority list. The data entry field may initially contain no data value. Alternatively, the data field could contain a pre-filled data value. In this case, if the user decides that the pre-filled data is acceptable, the user would be allowed to exit the user interface, as indicated by function block 104. If the user exits, the default format is finalized as the format to be used for processing. The widget is queried, as shown by function block 106, to provide the value for the pre-filled data using the finalized default format. The system then generates the value, at function block 108.

If the data entry field initially is empty, the user enters specified data thereinto, as shown by function block 110. Thereupon, as shown by function block 112, the user interface widget respectively determines, for the entered data, whether (1) none of the listed formats is valid for the specified data, (2) more than one of the listed formats is valid for the specified data, or (3) only one of the formats is valid for the specified data.

If none of the formats in the widget priority list is valid for the entered specified data, an error message is displayed to the user, as shown by function block 114 joined to function block 112 by means of the path 116. When this situation is encountered, the user is not allowed to exit the user interface. Instead, the user is routed back to the user data entry block 110, as indicated by path 118. The user must then modify the entered data, until the modified data is found to be valid for at least one listed format.

If the widget determines at function block 112 that more than one of the listed formats is valid for the entered specified data, the widget causes the data to initially be displayed in accordance with function block 120. Thus, the data is displayed as formatted using the first valid format specified by the format priority list. By enabling the user to view the entered data as initially formatted, the user can determine whether such formatting does or does not concur with the user's intent. If the user recognizes that the initial formatting is correct, the user may exit the user interface as indicated by function block 104. Thereafter, the widget is queried to provide the specified data value using the first valid format, in accordance with function block 106, and the value is then generated in accordance with function block 108.

Alternatively, in viewing the display referred to in connection with function block 120, the viewer could recognize that the first valid format is not the correct format for the entered data. In this event, the user would select another valid format, and then use the display capability to view the result of applying this format to the entered data. If necessary, the user could continue to select and display different formats applied to the data, until the correct format for the data was identified. Usefully, the format selection would be implemented by displaying a toggle button on the display field, to enable the user to toggle between respective valid formats.

After the correct valid format has been selected, the user is allowed to exit, in accordance with function block 104, such as by operating an exit button (not shown) or the like. Thereafter, the widget is queried to provide the value of the specified data for the correct valid format, selected by means of the toggle feature. After querying the widget, the data value is generated by the processing system, in accordance with function block 108, using the selected correct format.

If the widget determines at function block 112 that only one format is valid, the widget operates to display the specified data using the single valid format only. This is indicated by function block 124, joined to function block 112 by path 126. Moreover, the user is not allowed to toggle or change to a different format. If the data specified by the user is formatted correctly using the single valid format, the user is allowed to exit the system, as indicated by path 128. The functions respectively shown by blocks 106 and 108 are then performed, using the single valid format. On the other hand, if the data originally specified by the user is not formatted correctly by the single valid format, the user would proceed to modify the original data, as indicated by function block 110 and path 130.

Figure 2:
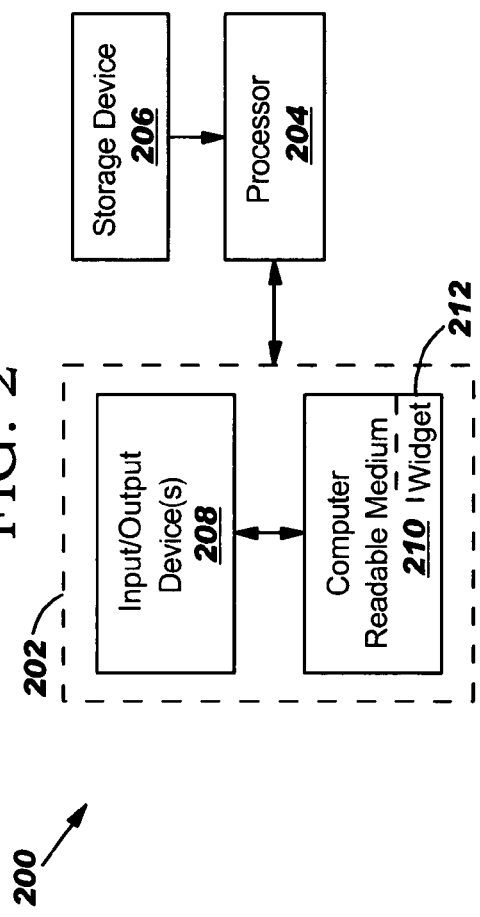
FIG. 2 is a block diagram showing components in simplified form of a system for implementing an embodiment of the invention.

Referring to FIG. 2, there is shown a simplified processing system 200 for implementing embodiments of the invention. System 200 generally comprises a user interface 202, a processor 204 and a storage device 206, such as a database or the like for storing data required for or associated with operation of processor 206. User interface 202 comprises input and output (I/O) devices 208, and further comprises a computer readable medium 210. The I/O devices 208 may include conventional devices, such as a keyboard for entering data into processing system 200, and a monitor for displaying entered data and formatted data.

Referring further to FIG. 2, there is shown a widget 212 incorporated into a computer program product such as computer readable medium 210. Widget 212 is constructed to control operation of an embodiment of the invention, as described above, and to direct performance of the respective functions thereof. Thus, widget 212 is disposed to control a monitor or other display device 208 in performing respective display tasks described in connection with FIG. 1. These tasks would include generation, display and operation of the toggle button. Widget 212 contains the format priority list referred to above, and is responsive to data entered into user interface 202 by means of a keyboard or other input device 208. Widget 212 may also instruct processor 204 to generate data values in accordance with function block 108 of FIG. 1.

Without limitation, and by way of example only, computer readable medium could include recordable-type media, such as a floppy disk, a hard disk drive, a RAM, CD-ROMS, DVD-ROMs, and transmission-type media, such as digital and analog communication links, and wired or wireless communication links using transmission forms, such as, for example, radio frequency and light wave transmissions.

Figure 3:
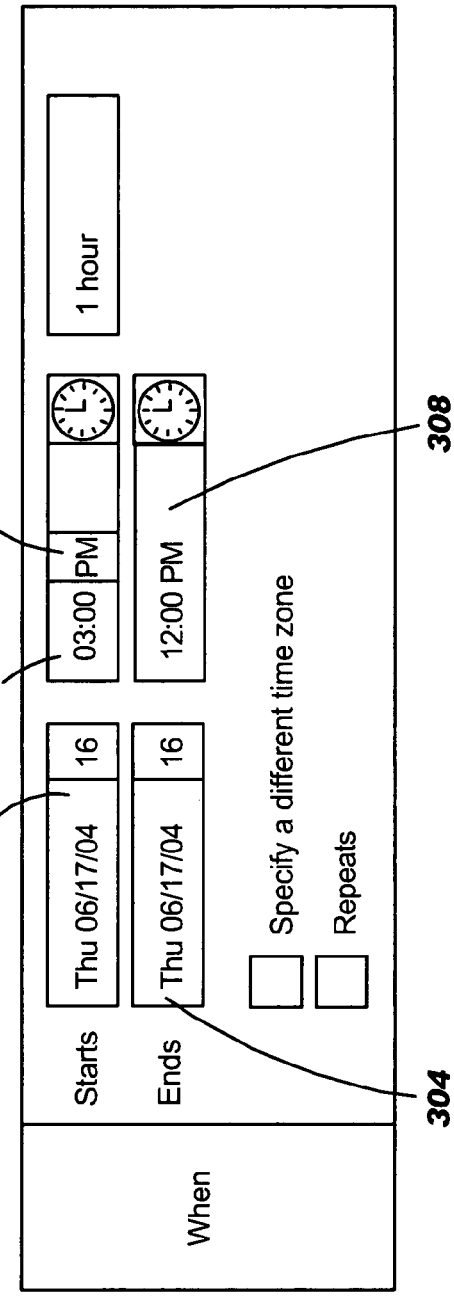
FIG. 3 shows a screen for use in illustrating an embodiment of the invention.

Referring to FIG. 3, there is shown a screen display generated by a display device 208 or the like, operated by a widget 212 in accordance with an embodiment of the invention. More particularly, FIG. 3 depicts a screen display item 300, that is similar to a screen which may be generated by a processing system controlled by software such as Lotus Notes, Rev. 6 or the like. Display item 300 is a calendar item serving as a reminder of some event, and has fields 302 and 304 for entering the event start date and end date, respectively. In addition, item 300 has fields 306 and 308 for entering the event start time and end time, respectively.

As stated above, without an "a.m." or "p.m." designation, a time entry can be ambiguous. Accordingly, the widget 212 associated with display 300 is provided with a list of data format priorities comprising "a.m." as a first priority format, and "p.m." as the next priority format. Clearly; both formats would be valid for a specified time value entered into field 306 or 308. After entering a time value such as 3:00, the user would display the entered data in accordance with function block 112 of FIG. 1, using the first priority format. Thus, the user would see "3:00 a.m." as the start time. Knowing this to be incorrect, however, the user would operate a toggle button 310, displayed on field 306, to select the format "p.m." rather than the format "a.m.".

In a further embodiment of the invention used in connection with the RPG wizard, a widget provides a format priority list that includes "quotes on" and "quotes off" formats. The "quotes on" format results in a data entry being wrapped in quotation marks. The widget further provides the capability to toggle between the two formats. The widget uses a specified initial preference setting to determine the default (quotes on/off) behavior. It also uses specified validation codes to determine if the contents must or must not be wrapped in quotation marks, and disables the toggle button if such a condition exists. On the other hand, if the contents of the data entry field can optionally be placed in quotation marks, then the user may use the toggle button to either enable or disable the quotation marks. The widget allows the user to visually see exactly how the wizard will modify any entered data values prior to generating code.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for operating a user interface to ensure that specified data entered into a processing system will be processed as intended by a user, said method comprising the steps of:
    providing said user interface with a widget that includes a data format priority list;
    operating said widget to determine whether one or more of said formats on said list is valid, or whether all of said formats on said list are invalid, for said specified data;
    initially displaying said specified data using the format having first priority on said list, only if at least one of said formats is valid for said data;
    if a plurality of said formats are valid for said specified data, selecting one or more valid formats from said list, displaying said data using each selected format to determine the respective result thereof, and then designating one of said selected formats for use in processing said specified data; and
    if none of said formats on said list is valid for said specified data, said widget issues an error message, and said user is allowed to modify said data.

2. The method of claim 1, wherein:
at least a portion of said entered specified data is entered automatically by said system, before said user enters any other portion of said specified data.

3. The method of claim 1, wherein:
if only said first priority format is valid for said specified data, either said widget is queried to provide the value for said data using said first priority format, or else said specified data is modified.

4. The method of claim 1, wherein:
said widget provides a toggle to enable a user to select any valid format from said list.

5. The method of claim 4, wherein:
said toggle comprises a toggle button selectively displayed by said widget.

6. The method of claim 1, wherein:
a user is allowed to exit from said user interface only after designating a format for use in processing said data that is valid either for said entered specified data, or for a modification thereof.

7. The method of claim 6, wherein:
said processing system generates a value for said specified or modified data using said designated format.

8. A computer system comprising:
    a processor;
    a user interface having a display device and a data entry device; and
    a computer readable medium connected to said processor and to said display and data entry devices, said computer readable medium including a widget provided with a data format priority list, and further including processor instructions configured to be read by said processor and to thereby cause said processor to:
    operate said widget to determine whether one or more formats, or no format, on said list is valid for specified data entered into said system;
    initially display said specified data using the format of first priority on said list, only if at least one of said formats is valid for said data;
    if a plurality of said formats are valid for said specified data, select one or more valid formats from said list, display said data using each selected format to determine the respective results thereof, and then designate one of said selected formats for use in processing said specified data; and
    if none of said formats on said list is valid for said specified data, operate said widget to issue an error message, and said user is allowed to modify said data.

9. The system of claim 8, wherein:
at least a portion of said entered specified data is entered automatically by said system, before said user enters any other portion of said specified data.

10. The system of claim 8, wherein:
if only said first priority is valid for said specified data, either said widget is queried to provide the value for said data using said only one format, or else said specified data is modified.

11. The system of claim 8, wherein:
said widget provides a toggle to enable a user to select any valid format from said list.

12. The system of claim 11, wherein:
said toggle comprises a toggle button selecting displayed by said widget.

13. The system of claim 8, wherein:
a user is allowed to exit from said user interface only after designating a format for use in processing said data that is valid either for said entered specified data, or for a modification thereof.

14. The system of claim 13, wherein:
said processing system generates a value for said specified or modified data using said designated format.

15. A computer program product on a recordable-type medium for operating a user interface to ensure that specified data entered into a processing system will be processed as intended by a user, said computer program product comprising:
  first instructions for providing said user interface with a widget that includes a data format priority list;
  second instructions for operating said widget to determine whether one or more of said formats, or no format, on said list is valid for said specified data;
  third instructions for initially displaying said specified data using the format having first priority on said list, only if at least one of said formats is valid for said data;
  fourth instructions for selecting one or more valid formats from said list, displaying said data using each selected format to determine the respective result thereof, and then designating one of said selected formats for use in processing said specified data if a plurality of said formats are valid for said specified data; and
  fifth instructions for operating said widget to issue an error message and allow said user to modify said data.

16. The computer program product of claim 15, wherein:
at least a portion of said entered specified data is entered automatically by said system, before said user enters any other portion of said specified data.

17. The computer program product of claim 15, wherein:
if only said first priority format is valid for said specified data, either said widget is queried to provide the value for said data using said first priority format, or else said specified data is modified.

18. The computer program product of claim 15, wherein:
said widget provides a toggle to enable a user to select any valid format from said list.

19. The computer program product of claim 18, wherein:
said toggle comprises a toggle button selectively displayed by said widget.

20. The computer program product of claim 15, wherein:
a user is allowed to exit from said user interface only after designating a format for use in processing said data that is valid either for said entered specified data, or for a modification thereof.

21. The computer program product of claim 20, wherein:
said processing system generates a value for said specified or modified data using said designated format.

* * * * *